P. CAMPBELL.
Bee Hive.
No. 97,759. Patented Dec. 14, 1869.
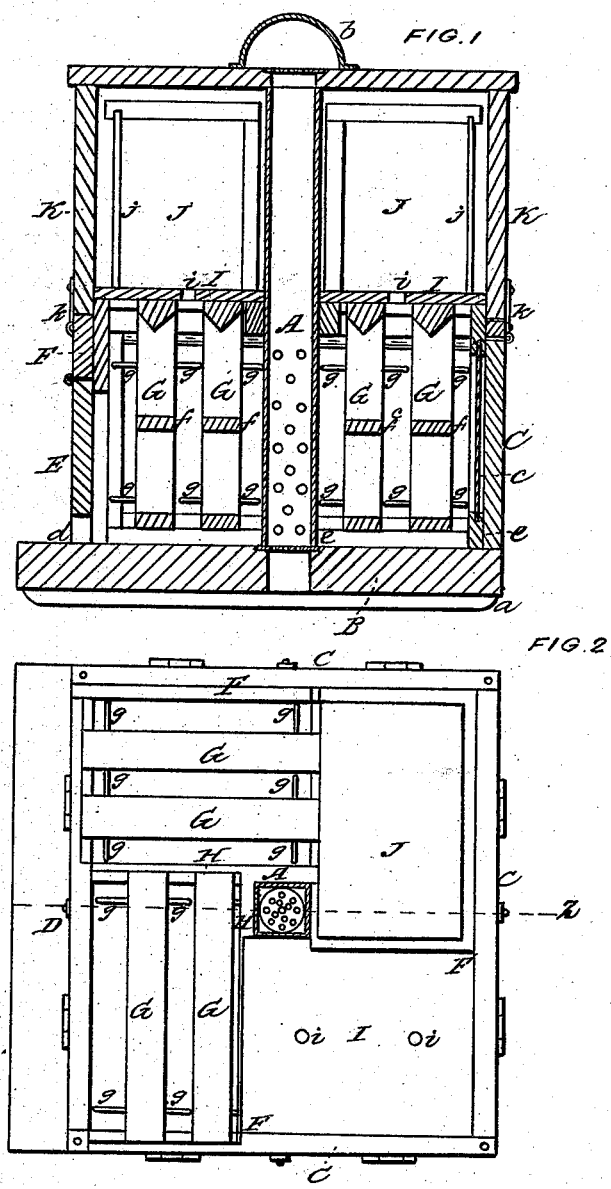

UNITED STATES PATENT OFFICE.

PETER CAMPBELL, OF CARROLLTOWN, PENNSYLVANIA.

IMPROVEMENT IN BEE-HIVES.

Specification forming part of Letters Patent No. 97,759, dated December 14, 1869.

*To all whom it may concern:*

Be it known that I, PETER CAMPBELL, of Carrolltown, in the county of Cambria and State of Pennsylvania, have invented a new and useful Improvement in Bee-Hives; and I do hereby declare the following to be a full, clear, and exact description thereof, sufficient to enable others skilled in the art to which my invention appertains to make and use the same, reference being had to the accompanying drawings, forming part of this specification, and in which—

Figure 1 is a vertical central section taken on the line $z\ z$ in Fig. 2; and Fig. 2 is a plan view, the top of the hive being removed to disclose the interior.

The principal feature of invention in this case consists in ventilating the hive by means of a vertical perforated tube situated within the hive, and open at both ends to permit a free circulation of air.

The invention further consists in the construction of the hive as a whole, and in the combination and arrangement of its various parts, all as hereinafter described.

In order that others may be enabled to fully understand my invention, so as to make and use my improved bee-hive, I will now proceed to describe it in detail.

Referring to the drawings, wherein similar letters indicate like parts in the two figures, A represents a vertical ventilating-tube running centrally through the hive, and open at top and bottom. The lower part of the tube is perforated, as shown, so as to admit a free circulation of air around and between the comb-frames. At each end of the tube A is fixed a screen of gauze or a perforated plate, to prevent the entrance of the moth.

$a\ a$ are cleats which elevate the bottom of the hive above the surface on which it is placed, so that the passage of air to the ventilating-tube will not be obstructed, even if the hive be covered with snow.

$b$ is a cap which covers the top of the tube A, and prevents the entrance of rain and snow.

Three sides of the lower compartment of the hive are made of glass plates $c\ c$, which fill the spaces between the corner-posts set in the bottom B of the hive. Through these glass sides the operations of the bees may be observed, and the interior of the hive inspected to see if it needs cleaning, without disturbing or incensing the bees in the least.

C C C are shutters, hinged at the top, which cover the glasses $c\ c$. The opening in the front D of the hive has no glass, but is provided with a door, E, also hinged at the top. This door does not entirely close the opening in the front of the hive, a narrow space, $d$, being always left open as a passage-way for the bees in entering and leaving the hive. Narrow spaces are also left at the bottom of each of the glass sides $c$; but in these are fitted removable blocks or strips $e\ e$. This is an important feature of my invention. When it is ascertained, from an inspection of the interior through the glass sides, that the hive needs cleaning, it is only necessary to remove the blocks $e\ e$, one or more, and scrape out the bottom of the hive with a suitable stick. With other hives, when they need cleaning, it is necessary to remove the bees, which is not only troublesome, but sometimes results in the loss of the bees.

On the top of the corner-posts of the hive rest the pieces F.

G G represent the comb-frames, hung in pairs, one end of each resting on the sides of the hive, and the other on pieces H H, of which there are four, jointed together around the ventilating-tube and supported in the sides of the hive. The comb-frames are strengthened by braces $f$, and are provided with projecting pins $g$, which prevent the two frames of a pair coming into contact.

The lower compartment of the hive is covered in by a floor composed of four removable sections, I I, matched together, each section having small orifices $i\ i$ communicating with the space between each two comb-frames, for the passage of the bees into the honey-boxes J J, which rest on the sections I I. These honey-boxes have each a glass side, $j$.

The upper part, K K, of the hive consists of four sides and a top, and is removable, being set on top of the sides of the lower part, and secured by hooks $k$, or in any other suitable manner.

This hive, as a whole, combines several important advantages, which will be appreciated by those engaged in apiculture and the economical production of honey. The hive is very simple and compact, and can be furnished at a moderate cost. It can be readily taken apart. The ventilator being protected at all times, the loss of a swarm of bees by smothering will never occur, while the interior of the hive can be at any time inspected and cleaned without molesting the bees.

I do not claim, broadly, a ventilating-tube combined with a bee-hive; nor do I lay a broad claim to the glass sides of the hive, being aware that these are old; but,

Having thus described my invention, what I claim as new, and desire to secure by Letters Patent, is—

1. The vertical ventilating-tube A, passing centrally through the hive, open at the top and bottom, and perforated and provided with screens, all substantially as herein described.

2. The construction of the hive proper of a base, B, glass sides and back c c c, hinged shutters C E, blocks e e, comb-frame supports H, removable upper portion, K K, and vertical central perforated tube, A, open at top and bottom, said hive containing the suspended comb-frames G, the removable sections I, and honey-boxes J, all constructed and arranged substantially as herein described and shown.

To the above specification of my invention I have signed my name, this 15th day of September, 1869, in the presence of two subscribing witnesses.

PETER CAMPBELL.

Witnesses.
GEO. W. ROTHWELL,
JOHN A. WIEDERSHEIM.